US007582865B2

(12) United States Patent
Schwartz et al.

(10) Patent No.: US 7,582,865 B2
(45) Date of Patent: Sep. 1, 2009

(54) TWO-DIMENSIONAL ION TRAP WITH RAMPED AXIAL POTENTIALS

(75) Inventors: Jae C. Schwartz, San Jose, CA (US); Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 273 days.

(21) Appl. No.: 11/804,619

(22) Filed: May 18, 2007

(65) Prior Publication Data

US 2008/0067360 A1 Mar. 20, 2008

Related U.S. Application Data

(60) Provisional application No. 60/811,263, filed on Jun. 5, 2006.

(51) Int. Cl.
*H01J 49/42* (2006.01)
*B01D 59/44* (2006.01)

(52) U.S. Cl. ....................... 250/292; 250/282; 250/281; 250/290

(58) Field of Classification Search ................. 250/292, 250/282, 281, 290
See application file for complete search history.

(56) References Cited

U.S. PATENT DOCUMENTS

| | | | | |
|---|---|---|---|---|
| 5,420,425 | A | 5/1995 | Bier et al. | |
| 6,797,950 | B2 | 9/2004 | Schwartz et al. | |
| 7,141,789 | B2 * | 11/2006 | Douglas et al. | 250/292 |
| 2003/0222210 | A1 | 12/2003 | Stott et al. | |
| 2005/0263696 | A1 * | 12/2005 | Wells | 250/292 |
| 2007/0158550 | A1 * | 7/2007 | Wells | 250/292 |
| 2007/0176096 | A1 * | 8/2007 | Wells | 250/292 |

* cited by examiner

*Primary Examiner*—Nikita Wells
(74) *Attorney, Agent, or Firm*—David E. Allred; Charles B. Katz

(57) ABSTRACT

The invention provides a two-dimensional ion trap, comprising a plurality of elongate electrodes positioned between first and second end electrodes, the plurality of electrodes and first and second end electrodes defining a trapping volume. A controller in electrical communication with the plurality of elongate electrodes and the first and second end electrodes is configured to progressively vary a periodic voltage applied to at least one of the plurality of elongate electrodes to cause ions to be radially ejected from the ion trap in order of their mass to charge ratios. Concurrently, the controller is configured to progressively vary a DC offset of least one of the first and second end electrodes with respect to the plurality of elongate electrodes.

19 Claims, 5 Drawing Sheets

Figure 1
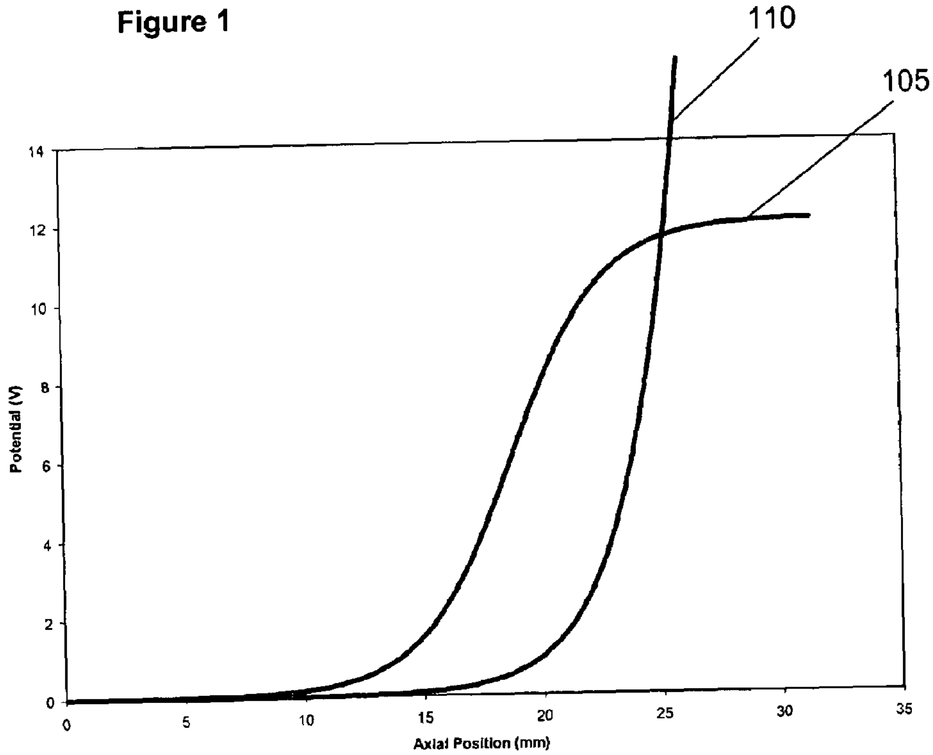
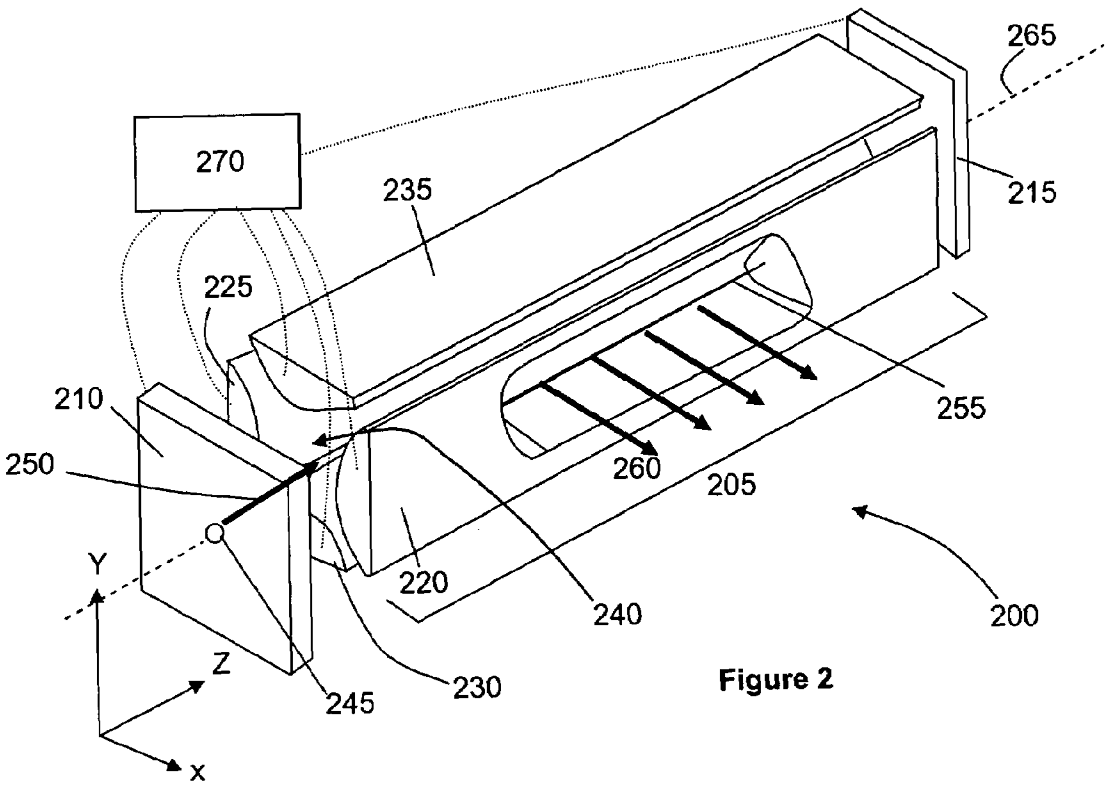
Figure 2

TWO-DIMENSIONAL ION TRAP WITH RAMPED AXIAL POTENTIALS

This application claims priority to U.S. provisional patent application Ser. No. 60/811,263, filed Jun. 5, 2006 by the same inventors.

FIELD OF THE INVENTION

This invention relates generally to a two-dimensional quadrupole ion trap operated as a mass spectrometer.

BACKGROUND OF THE INVENTION

Two-dimensional (linear) quadrupole ion traps are devices in which ions are introduced into or formed and contained within a trapping volume formed by a plurality of electrodes or rod structures by means of substantially quadrupolar electrostatic potentials generated by applying RF voltages, DC voltages or a combination thereof to the electrodes.

It is a constant challenge in manufacturing to maintain high yield rates for two-dimensional ion traps without compromising ion trap performance. The performance of an ion trap depends upon many things, including the structure of the ion trap itself, and its mode of operation, for example.

When using a mass selective instability scan in a two-dimensional ion trap, the ions are most efficiently ejected from the trap in a radial direction through an aperture in one or more of the electrodes (although some researchers have ejected ions between two of the quadrupole electrodes). When an aperture (or apertures) is cut into one or more of the two-dimensional ion trap electrodes to allow ions to be ejected from the device, the electric potentials are degraded from the theoretical quadrupole potential and therefore the presence of this aperture can impact several important performance factors.

The introduction of an aperture into a two-dimensional ion trap not only may degrade the theoretical quadrupole potential, but may also contribute to the degradation of the structural integrity of the rods themselves, thus leading to mechanical deviations in the axial direction (the direction substantially parallel to the length of the electrodes) and ultimately affecting the performance characteristics such as the resolution attainable by such an ion trap when used as a mass spectrometer.

The performance of a two-dimensional ion trap is more susceptible to mechanical errors than a three-dimensional ion trap. In a three-dimensional ion trap, all of the ions occupy a spherical or ellipsoidal space at the center of the ion trap, typically an ion cloud of approximately 1 mm in diameter. The ions in a two-dimensional ion trap, however, are spread out along a substantial fraction of the entire length of the ion trap in the axial direction which can be several centimeters or more. Therefore, geometric imperfections, misalignment of the rods, or the mis-shaping of the electrodes can contribute substantially to the performance of the two-dimensional ion trap. For example, if the quadrupole electrodes are not parallel along the substantial length of the electrodes, then ions at different axial positions within the ion trap experience slightly different field strength and therefore have slightly different q values. This variation in q value will in turn cause ejection times during mass analysis which are dependent on the ion respective axial position. The result is increased overall peak widths and degraded resolution.

As indicated above, one reason for the rejection of two-dimensional ion traps after it has been manufactured is its poor resolution during operation. Resolution for a two-dimensional ion trap is typically specified in terms of peak width (resolution=mass/peak width).

In addition to mechanical errors causing axial field inhomogeneity, the fringe fields caused by the end of the electrodes as well as the ends of any slots cut into the electrodes can also cause significant deviation in the strength of the radial quadrupole field along the length of the device. Ideally to keep the electric fields uniform, the ejection aperture would extend along the entire length of the electrode, but this presents numerous construction challenges. To avoid these, ejection slots are typically located only along some fraction of the central region (for example 60%) of the total ion trap length. This however leads to a variation in the radial quadrupolar potential near the ends of the slots in addition to the effects at the ends of the rods. Ions which reside in these areas are therefore ejected at different times than ions residing more in the center of the device and this again can result in a reduction in mass resolution.

It is known that the resolution for such devices can be improved by utilizing a large axial trapping field. This can be seen in FIG. 1, trace 105, which shows the axial potential as a function of axial position (the position of the ion cloud along the axial direction of the ion trap). A large axial trapping field reduces the axial spread of the ion cloud, compressing the cloud so that it experiences fewer field inhomogeneities. This enables a smaller variation in q values to be obtained and results in better resolution. Unfortunately, compression of the ion cloud simultaneously increases space charge induced mass shifts. This also compromises ion storage volume or space charge capacity for this device. Ultimately, altering the axial potential in this manner compromises between resolution and space charge capacity.

There is a need for an improved two-dimensional ion trap and a method of operating such a two-dimensional ion trap which enhances the resolution whilst producing a minimal impact on space charge capacity.

SUMMARY

In accordance with one aspect of the present invention, an apparatus and method are disclosed that overcome many of the drawbacks described above and others.

The invention provides a two-dimensional ion trap, comprising a plurality of elongate electrodes positioned between first and second end electrodes, the plurality of electrodes and first and second end electrodes defining a trapping volume. A controller is in electrical communication with the plurality of elongate electrodes and the first and second end electrodes. The controller is configured to progressively vary a periodic voltage applied to at least one of the plurality of elongate electrodes to cause ions to be radially ejected from the ion trap in order of their mass to charge ratios. Concurrently, the controller is configured to progressively vary a DC offset of at least one of the first and second end electrodes with respect to the plurality of elongate electrodes.

In general, in one aspect the invention the controller is configured to progressively vary a DC offset of the first and the second end electrodes with respect to the plurality of elongate electrodes. The DC offset can be varied in a series of steps. The series of steps can be discrete. The controller can increase the magnitude of the DC offset with increase of mass to charge ratio. The controller can increase the magnitude of the DC offset linearly with respect to mass to charge ratio.

Particular implementations can include one or more of the following features. The controller can increase the magnitude of the DC offset based on the minimum resolution value desired for an ejected ion of a particular mass to charge ratio.

The first and second end electrodes can comprise a plurality of electrodes arranged coaxially with corresponding ones of the elongated electrodes.

In accordance with an aspect of the present invention, a method for mass sequentially ejecting ions from a two dimensional ion trap having first and second end electrodes and a plurality of elongate electrodes can include one or more steps. For example, the steps may include progressively varying a periodic voltage applied to at least one of the elongate electrodes to cause ions to be radially ejected from the ion trap in order of their mass-to-charge ratios. Also, the method can include concurrently with step of progressively varying the periodic voltage, progressively varying a DC offset of at least one of the end electrodes with respect to the plurality of elongate electrodes.

The invention can be implemented to realize one or more of the following advantages. The utilization of a progressively varying DC offset can yield improved resolution for a particular mass to charge ratio or range of values. The utilization of a progressively varying DC offset can yield improved resolution over a wider range of mass to charge ratios compared to a fixed DC offset. The utilization of a progressively varying DC offset can allow a two-dimensional ion trap to pass a resolution specification that it may have failed if a fixed DC offset had been employed.

Other features and advantages of the invention will become apparent from the description, the drawings, and the claims.

BRIEF DESCRIPTION OF THE DRAWINGS

For a better understanding of the nature and objects of the invention, reference should be made to the following detailed description, taken in conjunction with the accompanying drawings, in which:

FIG. 1 is a graph showing axial trapping potential vs. axial position for various ion trap configurations.

FIG. 2 is a schematic illustration of a single section two-dimensional ion trap with end electrodes for axial trapping.

Like reference numerals refer to corresponding parts throughout the several views of the drawings.

DETAILED DESCRIPTION OF EMBODIMENTS

Figure 3:
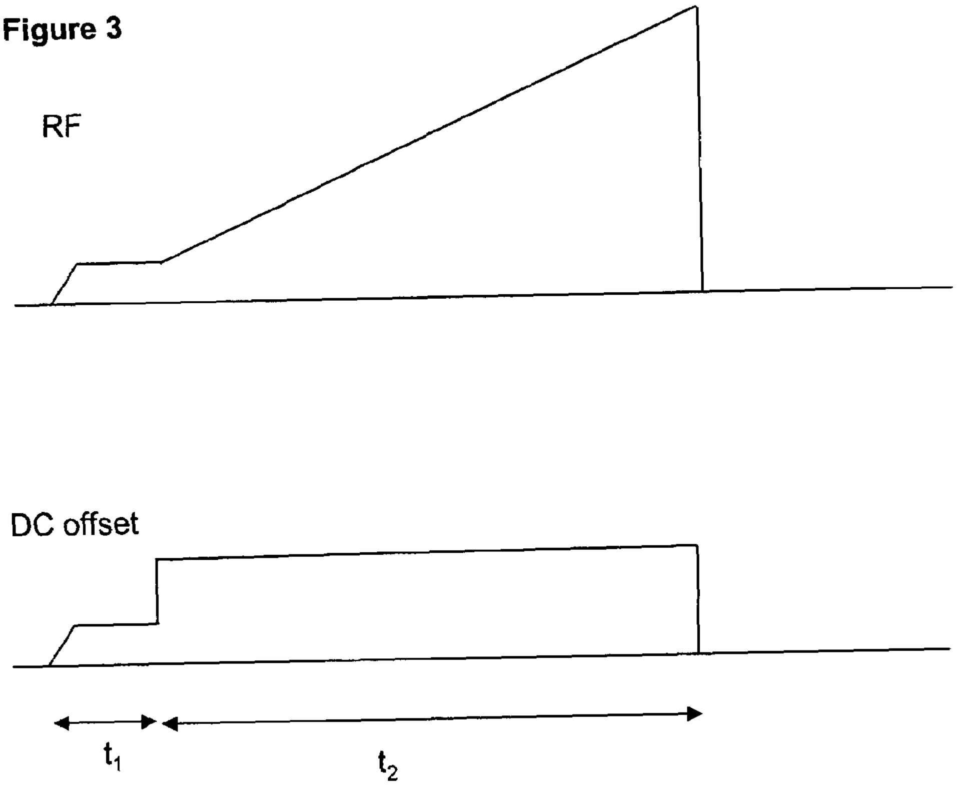
FIG. 3 depicts graphically the application of a fixed DC offset along with a ramped RF potential which ejects ions accordingly to mass to charge ratio from the ion trap.

A two-dimensional ion trap 200 which includes a single section 205 with axial trapping provided solely by DC voltages applied to the end lenses or electrodes 210 and 215 is illustrated in FIG. 2.

The two-dimensional substantially quadrupole structure 200 comprises a plurality of elongate electrodes or rods, in this particular case, two pairs of opposing elongate electrodes, a first pair 220, 225 and a second pair 230, 235. In this figure, as per convention, the elongate electrode pairs are aligned with the x and y axes and are therefore the first pair 220, 225 is denoted as the X elongate electrode pair, and the second pair 230, 235 is denoted as the Y elongate electrode pair. The elongate electrodes are positioned between first and second end plates (or lenses) 210 and 215 respectively. Together, in operation, the electrodes 210, 215, 220, 225, 230 and 235 define a trapping volume 240. At least one of the end electrodes 210 has an aperture 245, through which ions can be injected. Appropriate voltages can be applied to electrodes 210 and 215 to keep the ions trapped in the interior trapping volume 240, a volume, for example, on the order of 40 mm in length. The entrance end electrode 210 can be used to gate ions in the direction of the arrow 250 into the ion trap 200. The two end electrodes 210 and 215 differ in potential from the trapping volume 240 such that an axial "potential well" is formed in the trapping volume 240 to trap the ions.

An elongated aperture 255 in at least one of the X elongated electrode pair 220 and 225 allow the trapped ions to be mass-selectively ejected (in the mass selective instability scan mode) in the direction of the arrows 260, a direction orthogonal to the central axis 265 of the quadrupole ion trap structure 200. The central axis 265 extends longitudinally parallel to the elongated electrodes 220, 225, 230 and 235. This enables the ion trap 200 to be utilized as an ion trap mass spectrometer in which, for example, the ejected ions are passed onto a suitable detector to provide the mass-to-charge ratio information.

As illustrated, the two-dimensional substantially quadrupole potentials are generated by hyperbolic shaped elongated electrodes 220, 225, 230 and 235 with hyperbolic profiles to substantially match the equipotential contours of the quadrupolar RF potential desired within the structure. However, the elongated electrodes 220, 225, 230 and 235 may be generated by straight or other curved electrode shapes. Similarly, the geometry of the aperture 255 is dependent in part on the shape and curvature of the elongated electrodes.

The two-dimensional ion trap 200 is operated via a controller 270 in electrical communication with the plurality of elongate electrodes 220, 225, 230 and 235 and the first and second end electrodes 210 and 215. The controller 270 is configured to apply the necessary potential(s) to enable the two-dimensional ion trap 200 to capture, trap, store and subsequently eject the ions radially in order of their mass to charge ratios.

During ion injection, ions are axially injected into the two-dimensional ion trap structure 200. The ions are radially contained by the RF quadrupole trapping potentials applied to the X and Y elongated electrodes 220, 225, 230 and 235 respectively. The ions are axially trapped by applying trapping axial potentials, typically DC offset potentials, to the end electrodes 210 and 215. Damping gas such as Helium (He) or Hydrogen ($H_2$), at pressures near $1\times10^{-3}$ Torr is utilized to help reduce the kinetic energy of the injected ions and therefore increase the trapping and storage efficiencies of the linear ion trap. This collisional cooling continues after the ions are injected and helps to reduce the ion cloud size and energy spread which enhances the resolution and sensitivity during the detection cycle.

After a brief storage period, $t_1$, the trapping parameters are changed so that trapped ions become unstable in order of their mass-to-charge ratio. This may conventionally entail for example progressively varying a periodic voltage applied to at least one of the plurality of elongate electrodes 220, 225, 230 and 235, for example, changing the amplitude of the RF voltage so that it is ramped linearly to higher amplitudes over a period $t_2$, while a dipolar AC resonance ejection voltage is applied across the rods in the direction of the detection. This ejection process is illustrated in FIG. 3. These unstable ions develop trajectories that exceed the boundaries of the ion trap structure 200 and leave the field through an aperture 255 or series of apertures in the rod structure 220. The ions can be collected via a detector and the signal gained therefrom subsequently utilized to indicate to the user the mass spectrum of the ions that were trapped initially.

The two-dimensional ion trap described above can also be used to process and store ions for later axial ejection into an associated tandem mass analyzer such as a Fourier transform mass analyzer, RF quadrupole analyzer, time of flight analyzer, three-dimensional ion trap analyzer or an electrostatic analyzer.

A significant disadvantage of this design is that the axial trapping fields do not penetrate well into the interior of the ion trap 200, allowing ions to travel further from the center of the trap. This can be seen in FIG. 1, trace 110, which illustrates that when 200V is applied to the end lenses, ions with 1 eV of axial energy expand to cover approximately 40 mm (+/−20 mm from the center). This however means that the ions experience more axial field inhomogeneities due to the fringe fields at the end of the electrodes and the finite length of the ejection aperture, and the detected resolution of the ions ejected from the ion trap is affected.

Figure 4:
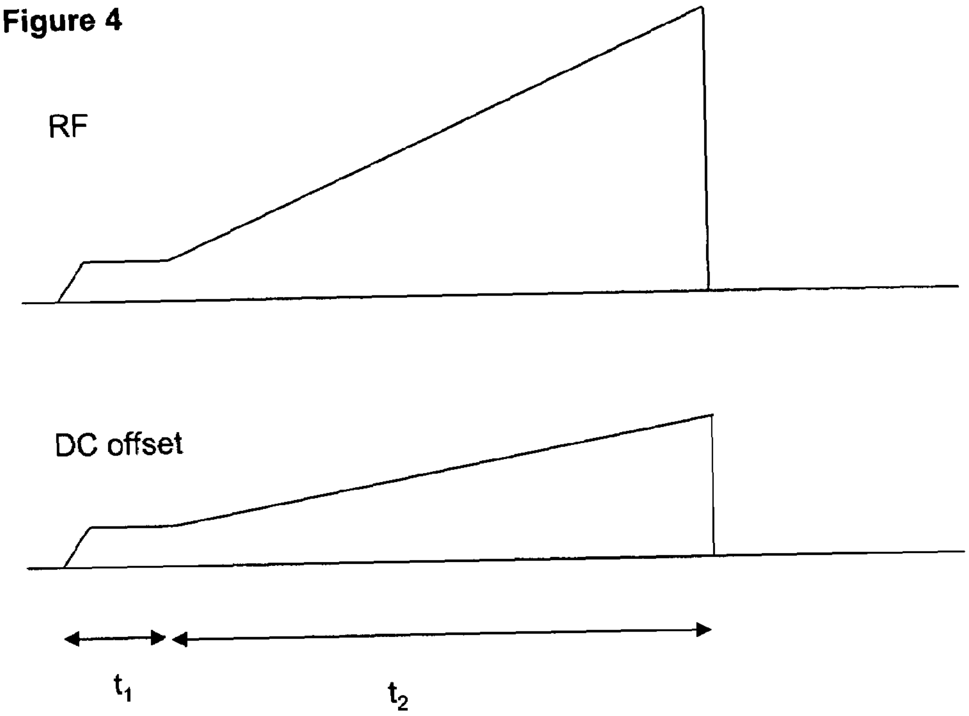
FIG. 4 depicts graphically the application of a progressively varying DC offset along with a progressively varying periodic voltage (RF) which ejects ions accordingly to mass to charge ratio from the ion trap.

In one aspect of the invention, the DC offset is progressively varied concurrently whilst the ions are being scanned out of the interior trapping volume 240 of the two-dimensional ion trap 200, as illustrated in FIG. 4. In this particular example, ions are being radially scanned out by progressively varying a periodic voltage (RF) applied to at least one of the elongate electrodes 220, 225, 230 and 235 (the same periodic voltage that was initially used to trap the ions), and an AC resonance excitation voltage applied to at least one the X pair of elongated electrodes 220 and 225 which include the ejection aperture(s) 255. The amplitude of the progressively varying periodic DC offset can be varied by ramping it or in a series of discrete steps, as afforded by a Digital-Analog Converter. Alternatively, if an analog circuit is utilized, the controller 270 can additionally provide for the progressively varying periodic RF voltage to be varied in a continuous manner, as illustrated in FIG. 4.

Initially, when the largest number of ions is trapped within the trapping volume of the two-dimensional ion trap 200, it is desirable to maximize the space charge capacity. According to another aspect of the present invention, a low DC offset can be applied while mass analyzing ions of low mass to charge ratio, and typical resolution specifications for an ion trap mass spectrometer can be met. The value of the low DC offset however has to be equal or greater than the value of the DC offset required to keep the ions trapped within the trapping volume, and not have them escape, unless of course they are being intentionally ejected. A high DC offset can be applied while mass analyzing ions of high mass to charge ratio, thus optimizing the resolution for these values. Although utilizing a high DC offset reduces the space charge capacity, at this point during operation, there are fewer ions actually trapped in the trapping volume (as the lower mass ions have already been ejected from the two-dimensional ion trap), and as a consequence, the space charge capacity is less critical at this point.

The progressively varying DC offset can be applied to either the first end electrode 210, the second end electrode 215, or both end electrodes 210 and 215. The option of progressively varying the DC offset to any of or any combination of the electrodes enables one to compensate for inaccuracies in manufacture that may occur closer to one end of the elongated electrodes than the other, or ones that occur at both ends of the ion trap.

According to yet another aspect of the present invention, the ion trap 200 is configured to be calibrated prior to sample analysis to provide a value of the minimal axial potential that is required to enable the mass to charge ratios of high value to fall within the resolution specification for any type of scan, or to fall below a maximum specified peak width allowable. This calibration can determine how the DC offset should be progressively varied to provide for maximum resolution across a range of mass to charge ratios that are ejected from an ion trap. In this regard, for example, the magnitude of the DC offset can be controlled by the controller based on a maximum specified peak width desired for an ejected ion of a particular mass to charge ratio value. A unique calibration is typically required for each instrument, and may depend upon the mass to charge ratio values being analyzed or the range of mass to charge ratio values being analyzed. Different calibrations are not however required between the different scan modes, for reasons which will become clear later. During such a calibration, it will also be apparent to one skilled in the art whether the DC offset need be applied to one or the other or both of the end electrodes.

Figure 5:
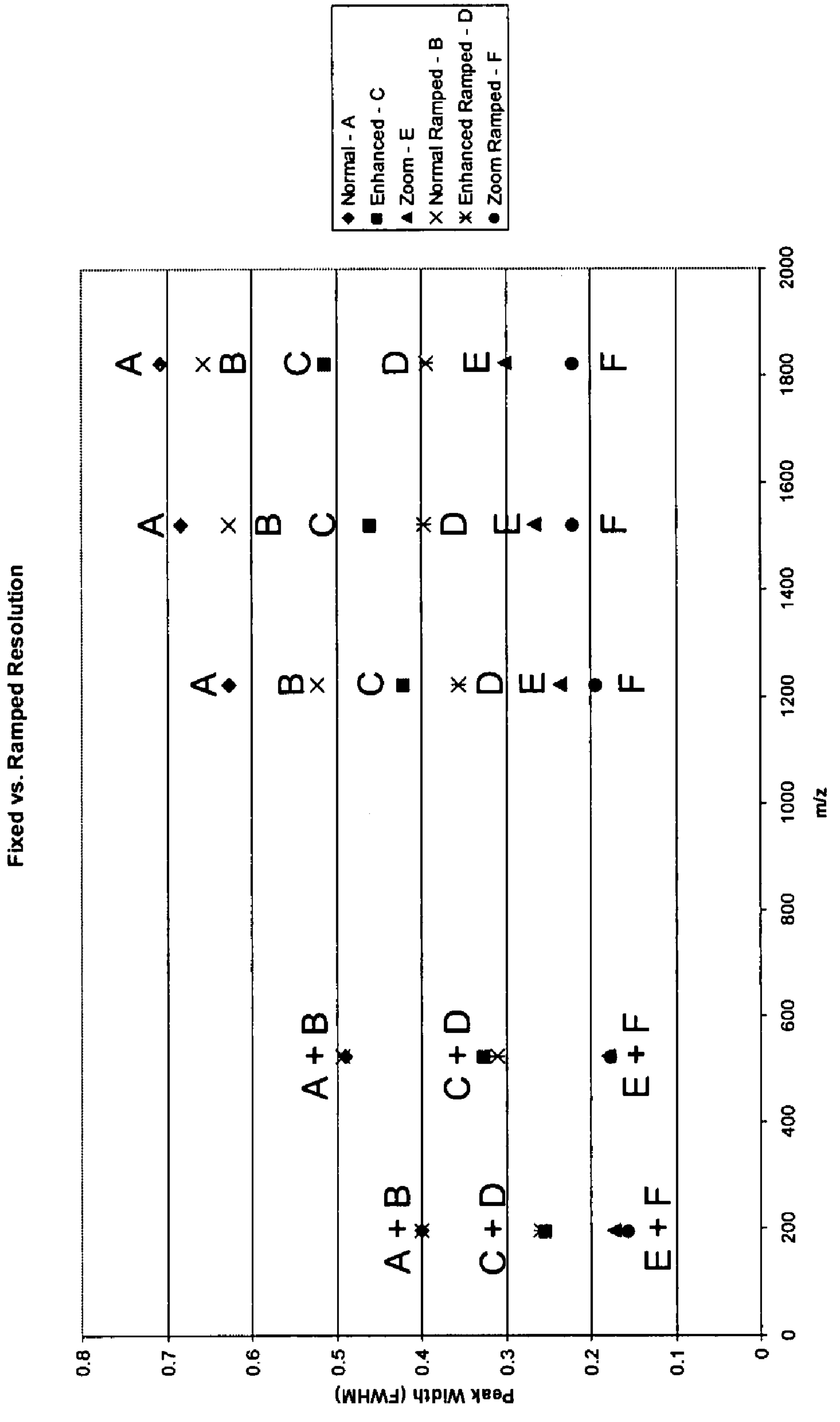
FIG. 5 is a graph which shows the resolution attainable for ions of various m/z values under differing scanning conditions.
Figure 6:
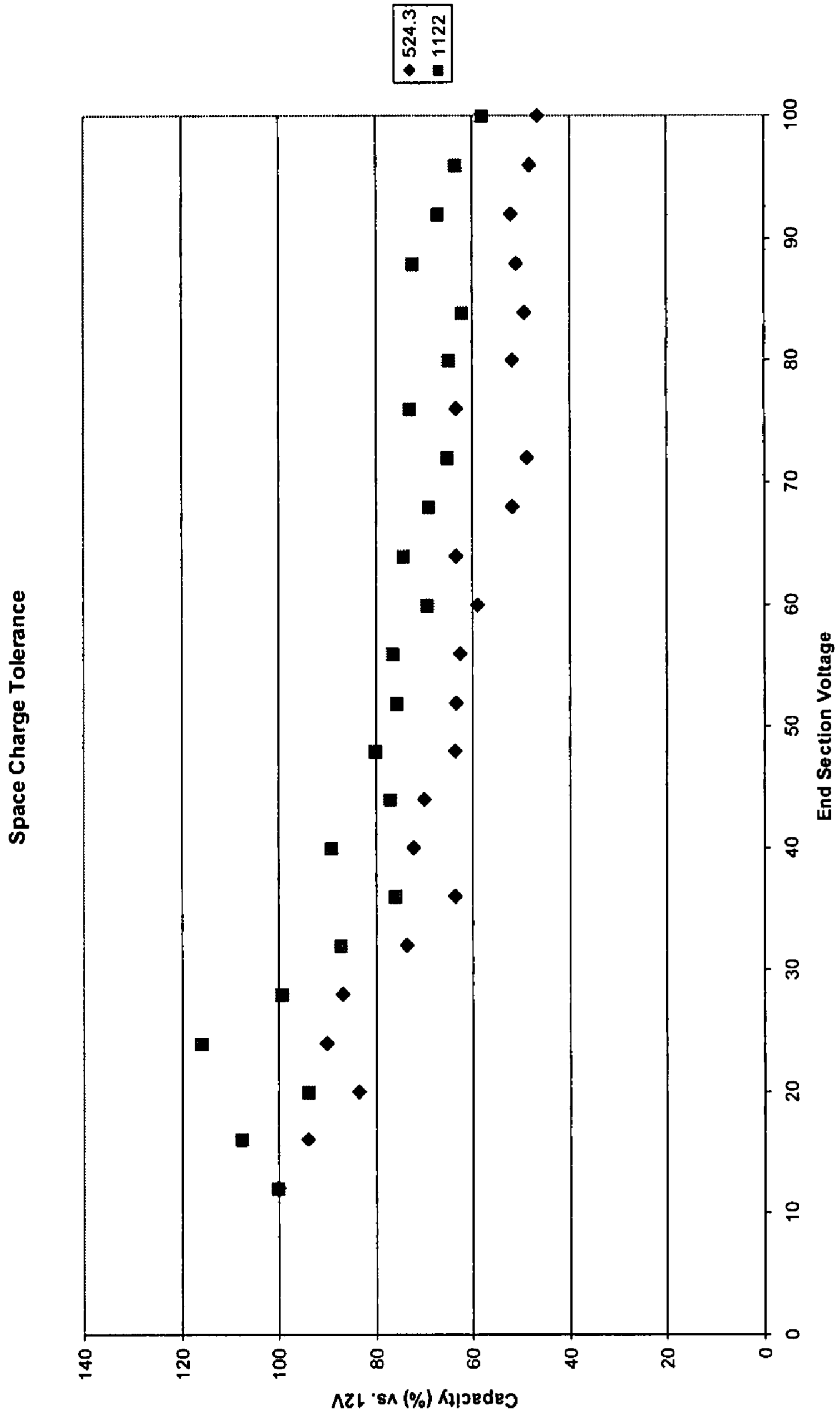
FIG. 6 is a graph which shows the variation in ion trap capacity for two m/z values as the offset of the end section or end electrode is varied.

Experimental data is shown in FIGS. 5 and 6 which illustrate how the axial dispersion of the ion cloud can be controlled in order to achieve a particular resolution (or peak width), whilst at the same time minimizing the impact on space charge capacity.

FIG. 5 shows a graph of the resolution attainable for ions of various m/z values under differing scanning conditions. Since resolution is related to the peak width, the graphical representation shows the variation of peak width with mass to charge ratio.

Following the plot identified with diamond-shaped icons (♦), the icons labeled A, one can see that as the m/z ratio increases during normal scan mode, the peak width increases. At m/z 1822, the maximum peak width is above 0.7 m/z, which may cause this ion trap to be rejected by manufacturing because it failed the normal scan resolution limit at 1822, the limit typically being in the region of 0.62 amu. Peak widths of greater than approximately 0.7 amu severely limit the usefulness of the spectra data since isotopic ions can no longer be distinguished from one another. By these standards, this ion trap would be considered to be of questionable construction quality and most likely have been rejected by the quality control people because it failed normal scan resolution requirements approximately half the time at m/z ratio 1822 when using a fixed axial DC offset potential of 12V.

When a slower scan mode (called the enhanced scan) is applied, as illustrate by the square-shaped icons (■), the icons labeled C, as the m/z ratio increases it can be seen that once again the peak width increases beyond the maximum manufacturing specification of 0.45 for this scan rate.

Running a DC offset calibration using the normal scan rate, it was determined that a peak width of better than 0.65 m/z could be obtained for m/z ratio 1822 if a DC offset of approximately 46V was applied, as illustrated with the x icons (x), the icons labeled B. Since a 12V axial potential value is known to guarantee that ions remain trapped within the trapping volume (although a lower potential value may also guarantee this) and a 46V DC offset value is required to ensure that ions of m/z ratio 1822 yield a resolution which avoids the trap from being rejected; a DC offset that progressively varies from 12 to 46 at m/z 1822 or (46−12)/1822=approximately 19 mV per m/z is required. FIG. 5 demonstrates that significant improvements in resolution at high m/z values can be attained by using such a progressively varying DC offset potential.

Although the DC offset calibration was performed using the normal scan rate (60 μsec/amu), the improvement is seen to be carried forward to both the enhanced scan rate (200 μsec/amu) and the zoom scan rate (900 μsec/amu), identified by the letters D and F respectively.

By utilizing a progressively varying DC offset on at least one of the end electrodes 210, 215, the peak widths are shown to decrease (resolution has been increased) to below 0.65 amu, which approaches standard ion trap performance specifications, enabling this device to produce useful mass spectra.

The trade off for improving the resolution using most methods is that due to compression of the ion cloud size the space charge is increased, and the capacity of the device is reduced. FIG. 6 illustrates a plot of the end section or end electrode voltage as a function of the capacity of the ion trap. It compares the effect of the progressively varying DC offset on space charge tolerance at a normal scan rate for 2 different m/z ratio values 524.3 and 1122.

If a fixed axial potential of 46V was utilized, which would be required for this particular trap to pass the resolution specification, the space charge tolerance would be reduced by approximately 30 percent. Using the progressively varying DC offset, the space charge tolerance at m/z ratios 524 and 1122 are shown to be reduced by only approximately ten percent.

For two-dimensional ion traps of high construction quality, a much reduced progressively varying DC offset will be required, and this will in turn provide a higher quality ion trap with a larger space charge capacity. For example, it was found that one particular ion trap produced an average peak width of 0.69 at 1822 using a fixed axial potential of 12V. The axial potential calibration determined that only 2.5 mV per m/z ramp rate was necessary to provide peak widths that would reliably pass resolution calibration at all scan rates.

It will be appreciated that although discussed with reference to a non-segmented two-dimensional ion trap, the teachings of the present invention can be applied to a segmented two-dimensional ion trap or a two-dimensional ion trap of other configurations, as discussed in U.S. Pat. No. 5,420,425, entitled "ION TRAP MASS SPECTROMETER SYSTEM AND METHOD" issued to Bier et al. May 30, 1995, which is hereby incorporated by reference. In this instance, the end electrodes would take the form of end sections, each end section comprising a plurality of electrodes arranged coaxially with corresponding ones of the elongated electrodes.

Figure 7:
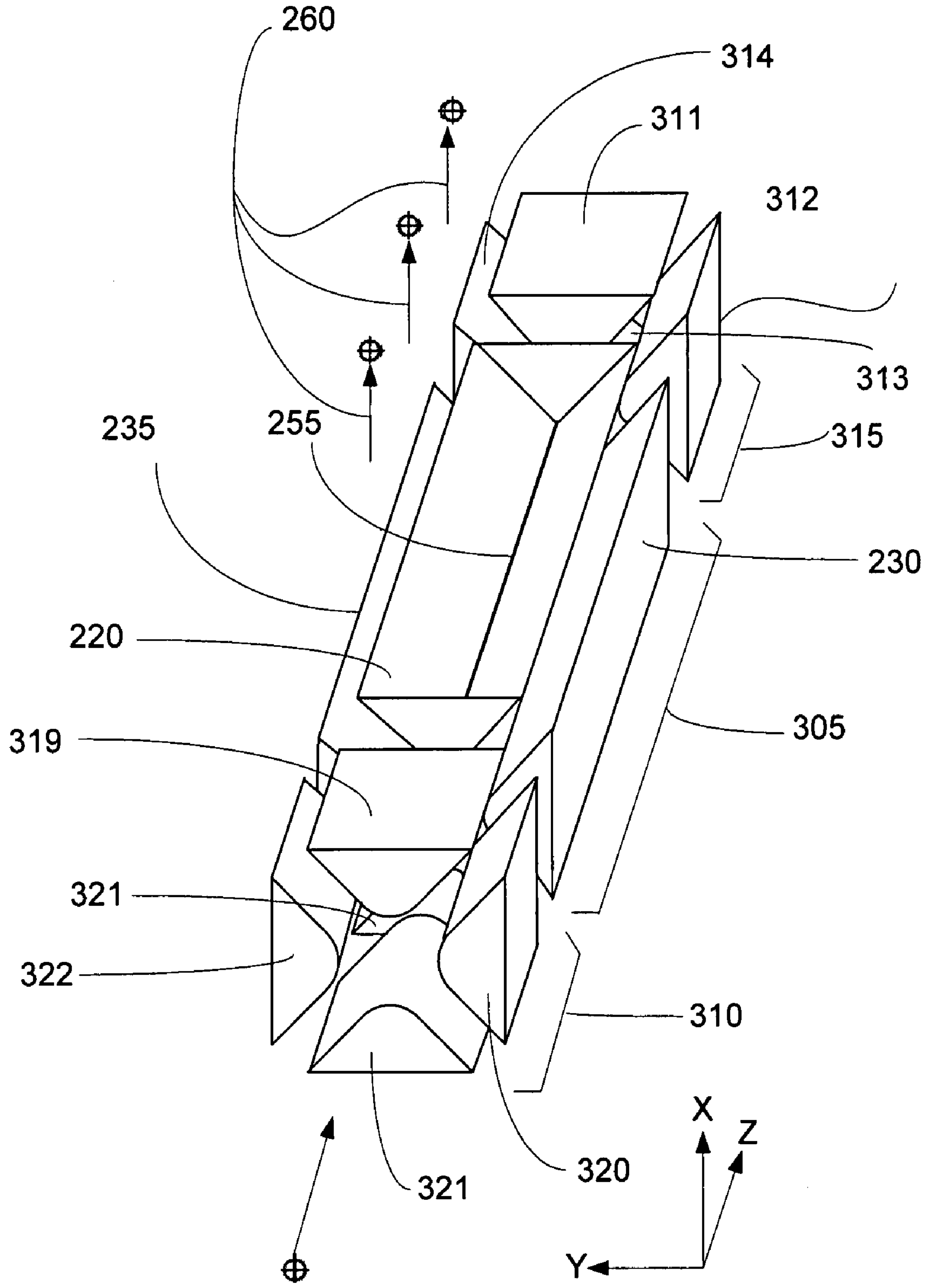
FIG. 7 is a perspective schematic view similar to FIG. 2 of an alternative embodiment of a two-dimensional ion trap including plural sections with end sections forming end electrodes for axial trapping.

In fact, FIG. 7 is a perspective view of a two dimensional ion trap 300 similar to the ion trap shown in FIG. 2A of U.S. Pat. No. 5,420,425 to Bier et al. The two dimensional ion trap of FIG. 7 may take the place of the ion trap 200 shown and described with regard to FIG. 2. Like elements are labeled with the same numerals as those of FIG. 2. Instead of a single segment, the ion trap 300 of FIG. 7 has at least one central segment 305 including the plurality of elongate electrodes 220, 225, 230, 235 similar to those of FIG. 2. Instead of end electrodes, the ion trap 300 of FIG. 7 has first and second end segments 310 and 315 comprising respective sets of end electrodes. The first end segment 310 has the first set including a first plurality of rod electrodes 319, 320, 321, and 322. The second end segment 315 has the second set including a second plurality of rod electrodes 311, 312, 313, and 314. The rod electrodes of the end segments 310, 315 may be arranged coaxially with the elongate electrodes of the central segment 305. A controller can be connected to each of the elongate electrodes of the central segment 305 and each of the electrodes of the end segments 310, 315 similar to the embodiment of FIG. 2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A two-dimensional ion trap, comprising:

a plurality of elongate electrodes positioned between first and second end electrodes, the plurality of elongate electrodes and first and second end electrodes defining a trapping volume; and a controller in electrical communication with the plurality of elongate electrodes and the first and second set of end electrodes, the controller being configured to progressively vary a periodic voltage applied to at least one of the plurality of elongate electrodes to cause ions to be radially ejected from the ion trap in order of their mass-to-charge ratios, and to concurrently progressively vary a DC offset of at least one of the end electrodes with respect to the plurality of elongate electrodes; wherein the controller increases the magnitude of the DC offset based on a maximum specified peak width desired for an ejected ion of a particular mass to charge ratio value.

2. The two-dimensional ion trap of claim 1, wherein the controller is configured to concurrently progressively vary a DC offset of the first and the second end electrode with respect to the plurality of elongate electrodes.

3. The two-dimensional ion trap of claim 1, wherein the controller varies the DC offset in a series of steps.

4. The two-dimensional ion trap of claim 3, wherein the steps are discrete.

5. The two-dimensional ion trap of claim 1, wherein the controller increases the magnitude of the DC offset as the mass-to-charge ratio of the ejected ions increases.

6. The two-dimensional ion trap of claim 1, wherein the controller increases the magnitude of the DC offset linearly with respect to mass to charge ratio.

7. The two-dimensional ion trap of claim 1, wherein the periodic voltage is an RF trapping voltage.

8. The two-dimensional ion trap of claim 1, wherein the first and second end electrodes each comprise a plurality of rod electrodes arranged coaxially with corresponding ones of the elongate electrodes.

9. The two-dimensional ion trap of claim 1, wherein the ions are ejected through at least one aperture formed in one or more of the elongate electrodes.

10. A method for mass sequentially ejecting ions from a two dimensional ion trap having first and second end electrodes and a plurality of elongate electrodes, comprising the steps of:

(a) progressively varying a periodic voltage applied to at least one of the elongate electrodes to cause ions to be radially ejected from the ion trap in order of their mass-to-charge ratios; and (b) concurrently with step (a), progressively varying a DC offset of at least one of the end electrodes with respect to the plurality of elongate electrodes; wherein the DC offset is increased in magnitude based on a maximum specified peak width desired for an ejected ion of a particular mass to charge ratio value.

11. The method of claim 10, further comprising the step of progressively varying the DC offset of the second of the end electrodes with respect to the plurality of elongate electrodes.

12. The method of claim 10, wherein the DC offset is varied in a series of steps.

13. The method of claim 12, wherein the steps are discrete.

14. The method of claim 10, wherein the magnitude of the DC offset increases as the mass to charge ratio of the ejected ions increases.

15. The method of claim 10, wherein the magnitude of the DC offset increases linearly as the magnitude of the mass to charge ratio of the ejected ions increases.

16. The method of claim 10, wherein the magnitude of the DC offset is determined by the resolution desired for a selected ejected ion with a particular mass to charge ratio value.

17. The method of claim 10, wherein the periodic voltage is an RF trapping voltage.

18. The method of claim 10, wherein the at least one of the first and second end electrodes comprises a plurality of rod electrodes arranged coaxially with corresponding ones of the elongate electrodes.

19. The method of claim 10, further comprising the step of ejecting the ions through an aperture formed in one or more of the elongate electrodes.

* * * * *